(12) United States Patent
Asai et al.

(10) Patent No.: US 9,434,241 B2
(45) Date of Patent: Sep. 6, 2016

(54) VEHICLE SUN VISOR

(71) Applicant: KYOWA SANGYO CO., LTD., Toyota-shi, Aichi (JP)

(72) Inventors: Takashi Asai, Toyota (JP); Kosuke Yamazaki, Okazaki (JP)

(73) Assignee: KYOWA SANGYO CO., LTD., Toyota-shi (JP)

( * ) Notice: Subject to any disclaimer, the term of this patent is extended or adjusted under 35 U.S.C. 154(b) by 0 days.

(21) Appl. No.: 14/618,807

(22) Filed: Feb. 10, 2015

(65) Prior Publication Data

US 2015/0151612 A1 Jun. 4, 2015

Related U.S. Application Data

(62) Division of application No. 13/903,072, filed on May 28, 2013, now Pat. No. 9,033,392.

(30) Foreign Application Priority Data

May 30, 2012 (JP) .................. 2012-123480
Jun. 7, 2012 (JP) .................. 2012-130035

(51) Int. Cl.
  *B60J 3/00* (2006.01)
  *B60J 3/02* (2006.01)
(52) U.S. Cl.
  CPC .......... *B60J 3/0265* (2013.01); *B60J 3/0252* (2013.01)
(58) Field of Classification Search
  CPC .... B60J 3/0265; B60J 3/0278; B60J 3/0282; B60J 3/0204; B60J 3/0252; B60J 3/0239; B60J 3/0217; B60J 3/0208
  USPC ............ 296/97.9, 97.1, 97.11, 97.12, 97.13, 296/97.2, 97.5, 97.6, 97.7, 97.8
  See application file for complete search history.

(56) References Cited

U.S. PATENT DOCUMENTS

| | | | | |
|---|---|---|---|---|
| 4,469,367 A | * | 9/1984 | Kuttler | B60J 3/0265 296/97.9 |
| 4,617,699 A | * | 10/1986 | Nakamura | B60J 3/0252 16/262 |
| 4,620,742 A | * | 11/1986 | Gavagan | B60J 3/0213 296/97.9 |
| 5,251,949 A | * | 10/1993 | Miller | B60J 3/0265 16/297 |

(Continued)

FOREIGN PATENT DOCUMENTS

| | | |
|---|---|---|
| JP | 11-157334 A | 6/1999 |
| JP | 2002-012028 A | 1/2002 |
| JP | 2003-312258 A | 11/2003 |

OTHER PUBLICATIONS

Feb. 2, 2015 Notice of Allowance issued in U.S. Appl. No. 13/903,072.

(Continued)

*Primary Examiner* — Kiran B Patel
(74) *Attorney, Agent, or Firm* — Oliff PLC

(57) ABSTRACT

A vehicle sun visor includes: a sun visor body; a support shaft; and a damper configured to apply braking force at the time when the sun visor body turns. The damper includes: a rotor and a rotor case that supports the rotor such that the rotor is rotatable around its axis. The rotor includes a cylindrical portion in which the support shaft is inserted, the cylindrical portion being held so as to be non-rotatable with respect to the support shaft. The rotor case is held by the sun visor body in a state where the rotor case is non-rotatable with respect to the sun visor body.

17 Claims, 8 Drawing Sheets

(56) References Cited

U.S. PATENT DOCUMENTS

| | | | | |
|---|---|---|---|---|
| 5,338,083 A * | 8/1994 | Gute | ...................... | B60J 3/0265 296/97.12 |
| 5,383,700 A * | 1/1995 | Agro | ...................... | B60J 3/0265 296/97.12 |
| 5,449,215 A * | 9/1995 | Viertel | ................... | B60J 3/0265 264/279.1 |
| 5,454,617 A * | 10/1995 | Welter | ................... | B60J 3/0204 296/97.12 |
| 5,556,155 A * | 9/1996 | Welter | ................... | B60J 3/0252 296/97.12 |
| 5,769,188 A * | 6/1998 | Okabe | .................... | A47K 13/12 188/82.77 |
| 5,924,748 A * | 7/1999 | Zapinski | ................ | B60J 3/0265 296/97.1 |
| 5,934,734 A * | 8/1999 | Wilson | ................... | B60J 3/0239 296/97.11 |
| 6,010,174 A * | 1/2000 | Murdock | ............... | B60J 3/0239 296/97.11 |
| 6,059,348 A | 5/2000 | Viertel et al. | | |
| 6,264,264 B1 * | 7/2001 | Kato | ...................... | B60J 3/0265 296/97.12 |
| 6,273,489 B1 * | 8/2001 | Viertel | ................... | B60J 3/0217 296/97.9 |
| 6,296,293 B1 * | 10/2001 | Peterson | ................ | B60J 3/0239 296/97.1 |
| 6,962,385 B2 * | 11/2005 | Wieczorek | ............. | B60J 3/0204 296/97.11 |
| 6,969,100 B2 | 11/2005 | Totani et al. | | |
| 7,000,972 B2 * | 2/2006 | Asai | ...................... | B60J 3/0265 296/97.11 |
| 7,066,522 B2 * | 6/2006 | Torii | ...................... | B60J 3/0265 296/97.12 |
| 7,090,281 B2 | 8/2006 | Davey et al. | | |
| 7,204,539 B2 * | 4/2007 | Wieczorek | ............. | B60J 3/0239 296/97.9 |
| 7,213,865 B2 * | 5/2007 | Torii | ...................... | B29C 49/20 296/97.1 |
| 7,234,209 B2 | 6/2007 | Totani et al. | | |
| 7,234,751 B2 * | 6/2007 | Umemura | .............. | B60J 3/0265 296/97.12 |
| 7,308,736 B2 * | 12/2007 | Nakazato | ............... | B60N 3/026 24/289 |
| 7,416,063 B2 * | 8/2008 | Araki | ...................... | F16F 9/145 16/54 |
| 7,823,954 B2 * | 11/2010 | Jones | ....................... | B60J 3/026 396/97.11 |
| 7,926,864 B2 * | 4/2011 | Welter | ................... | B60J 3/0265 296/97.12 |
| 2003/0234549 A1 | 12/2003 | Totani et al. | | |
| 2004/0090080 A1 * | 5/2004 | Yasuhara | ................... | B60J 3/02 296/97.9 |
| 2004/0251746 A1 | 12/2004 | Ichimaru et al. | | |
| 2005/0225114 A1 * | 10/2005 | Davey | .................... | B60J 3/0239 296/97.11 |
| 2005/0248167 A1 * | 11/2005 | Totani | .................... | B60N 3/023 296/1.02 |
| 2006/0032021 A1 | 2/2006 | Fukuo | | |
| 2006/0113819 A1 * | 6/2006 | Remy | .................... | B60J 3/0278 296/97.11 |
| 2006/0174584 A1 | 8/2006 | Nakazato | | |
| 2006/0175861 A1 * | 8/2006 | Ikeda | ..................... | B60J 3/0265 296/97.9 |
| 2006/0175869 A1 | 8/2006 | Torii et al. | | |
| 2007/0114847 A1 * | 5/2007 | Ichimaru | ................ | B60N 3/102 307/10.1 |
| 2007/0258256 A1 * | 11/2007 | Richard | ................. | B60J 3/0282 362/492 |
| 2009/0134657 A1 * | 5/2009 | Asai | ....................... | B60J 3/0239 296/97.11 |
| 2010/0001548 A1 * | 1/2010 | Okazaki | ................. | B60J 3/0239 296/97.2 |
| 2010/0013263 A1 * | 1/2010 | Okazaki | ................. | B60J 3/0265 296/97.11 |
| 2010/0090494 A1 | 4/2010 | Marcus et al. | | |
| 2013/0320698 A1 | 12/2013 | Asai et al. | | |
| 2013/0320699 A1 | 12/2013 | Asai et al. | | |
| 2013/0320702 A1 | 12/2013 | Asai et al. | | |
| 2015/0273988 A1 * | 10/2015 | Yamazaki | ................ | B60J 3/026 396/97.4 |

OTHER PUBLICATIONS

Feb. 2, 2016 Office Action issued in Chinese Application No. 201310209712.X.

* cited by examiner

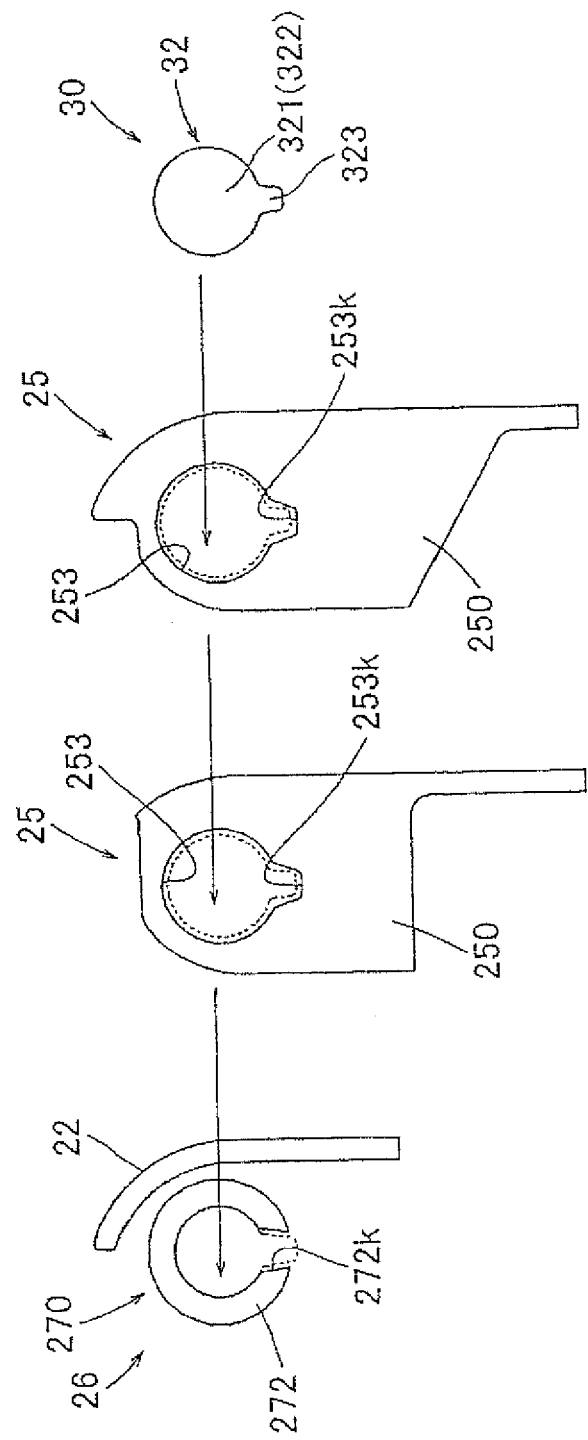

RLATED ART

RLATED ART

VEHICLE SUN VISOR

INCORPORATION BY REFERENCE

This application is a division of U.S. application Ser. No. 13/903,072, filed May 28, 2013, and claims priority to Japanese Patent Application No. 2012-123480, filed on May 30, 2012 and Japanese Patent Application No. 2012-130035, filed on Jun. 7, 2012. The prior applications, including the specifications, drawings and abstracts are incorporated herein by reference in their entirety.

BACKGROUND OF THE INVENTION

1. Field of the Invention

The invention relates to a vehicle sun visor that is configured to be turnable between a storage position at which a sun visor body is oriented along a ceiling surface of a vehicle cabin and a use position at which the sun visor body is able to block light.

2. Description of Related Art

A related vehicle sun visor is described in Japanese Patent Application Publication No. 2002-012028 (JP 2002-012028 A). As shown in FIG. 11, the vehicle sun visor 100 includes a sun visor body 101 and a support shaft 103 connected to a ceiling surface of a vehicle cabin by a bracket 102. Then, the sun visor body 101 is configured to be turnable around the axis of the support shaft 103 between a storage position at which the sun visor body 101 is oriented along the ceiling surface of the vehicle cabin and a use position at which the sun visor body 101 is able to block light. A bearing portion 105 for the support shaft 103 is provided inside the sun visor body 101, and a leaf spring 105b that radially sandwiches the support shaft 103 is set at the bearing portion 105. The leaf spring 105b is configured to be able to hold the sun visor body 101 at the shading position and, when the sun visor body 101 is returned to near the storage position, to apply turning force toward the storage position. Therefore, when the sun visor body 101 is located near the storage position, the sun visor body 101 is returned to the storage position by the spring force of the leaf spring 105b and is held at the storage position. As shown in FIG. 12, a damper 107 is provided inside the sun visor body 101, and the distal end of the support shaft 103 is coupled to the damper 107. The damper 107 applies braking force to a turn of the sun visor body 101 with respect to the support shaft 103, and functions to suppress turning speed with the spring force of the leaf spring 105b at the time when the sun visor body 101 turns toward the storage position. Thus, it is possible to suppress unpleasant sound due to a bump against the ceiling surface at the time when the sun visor body 101 is stored.

However, in the above-described vehicle sun visor 100, as shown in FIG. 12, a distal end portion 103f of the support shaft 103 is formed into a small-diameter cylindrical shape, a rotor 107r of the damper 107 is inserted in the distal end portion 103f, and then the rotor 107r and the distal end portion 103f are coupled by a coupling pin 108. In this way, because the rotor 107r of the small-diameter damper 107 is inserted in the small-diameter distal end portion 103f of the support shaft 103 and then the distal end portion 103f and the rotor 107r are coupled to each other, the strength of the coupling portion decreases. Therefore, for example, when an occupant attempts to turn the sun visor body 101 with strong operating force and then large force acts on the coupling portion between the support shaft 103 and the rotor 107r of the damper 107, the coupling portion may break.

SUMMARY OF THE INVENTION

The invention causes a coupling portion between a support shaft and a rotor of a damper not to break even when large force acts on the coupling portion.

A first aspect of the invention provides a vehicle sun visor. The sun visor body includes: a sun visor body; a support shaft mounted on a ceiling surface of a vehicle cabin and configured to support the sun visor body at a turning center position of the sun visor body such that the sun visor body is turnable between a storage position at which the sun visor body is oriented along the ceiling surface of the vehicle cabin and a use position at which the sun visor body is able to block light; and a damper configured to apply braking force when the sun visor body turns, wherein the damper includes: a rotor and a rotor case that supports the rotor such that the rotor is rotatable around its axis, the rotor includes a cylindrical portion in which the support shaft is inserted, the cylindrical portion being held so as to be non-rotatable with respect to the support shaft, and the rotor case is held by the sun visor body in a state where the rotor case is non-rotatable with respect to the sun visor body.

According to the above aspect of the invention, the rotor of the damper includes the cylindrical portion in which the support shaft is inserted. That is, the rotor of the damper is formed to have a larger diameter than the support shaft, and the support shaft is inserted in the rotor. Therefore, it is possible to relatively increase the strength of the coupling portion between the rotor of the damper and the support shaft. Therefore, the coupling portion between the support shaft and the rotor of the damper is hard to break even when an occupant attempts to turn the sun visor body with strong operating force and then large force acts on the coupling portion.

In the above aspect, a protrusion that retains the support shaft from the sun visor body may be formed on an outer periphery of the support shaft so as to protrude radially outward, a detent cutout, to which the protrusion of the support shaft is fitted in an axial direction, may be formed at the cylindrical portion of the rotor, and the support shaft and the cylindrical portion of the rotor may be held so as to be non-rotatable by fitting of the protrusion of the support shaft to the detent cutout of the cylindrical portion of the rotor. In this way, the protrusion for retaining the support shaft from the sun visor body may also be used as a rotation stopper between the support shaft and the rotor of the damper, so a reduction in the number of components is achieved.

According to the above aspect of the invention, the coupling portion between the support shaft and the rotor of the damper is hard to break even when large force acts on the coupling portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8A to FIG. 8D are schematic views that respectively show detent structures for the support shaft with respect to the damper and a retaining structure for the support shaft with respect to the bearing portion;

DETAILED DESCRIPTION OF EMBODIMENTS

Figure 1:
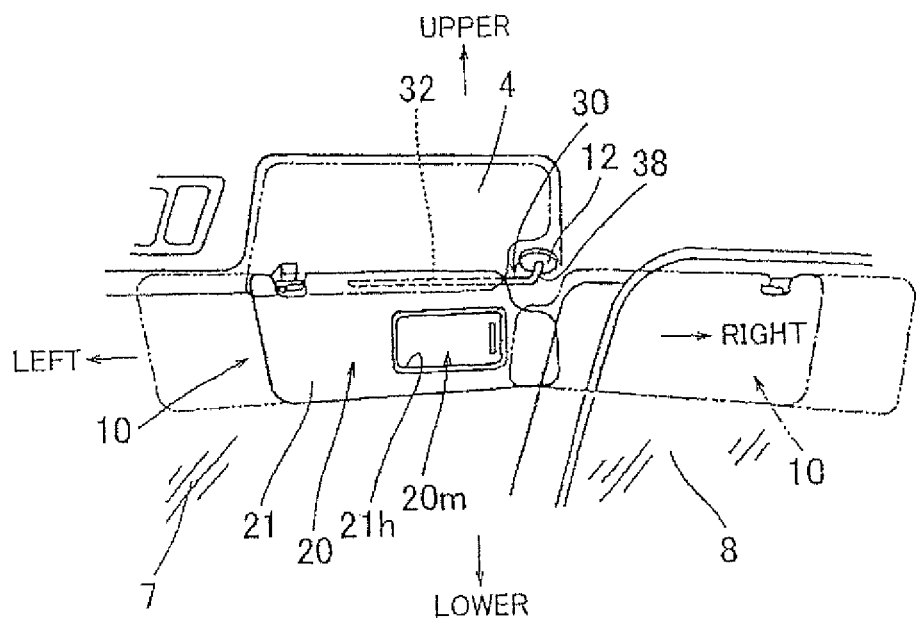
FIG. 1 is a schematic perspective view that shows a cabin of a passenger automobile that includes a vehicle sun visor according to a first embodiment of the invention.

Hereinafter, a vehicle sun visor according to an embodiment of the invention will be described with reference to FIG. 1 to FIG. 10B. Here, the front, rear, right, left, upper and lower in the drawings respectively correspond to the front, rear, right, left, upper and lower of a vehicle to which the vehicle sun visor is mounted.

Figure 2:
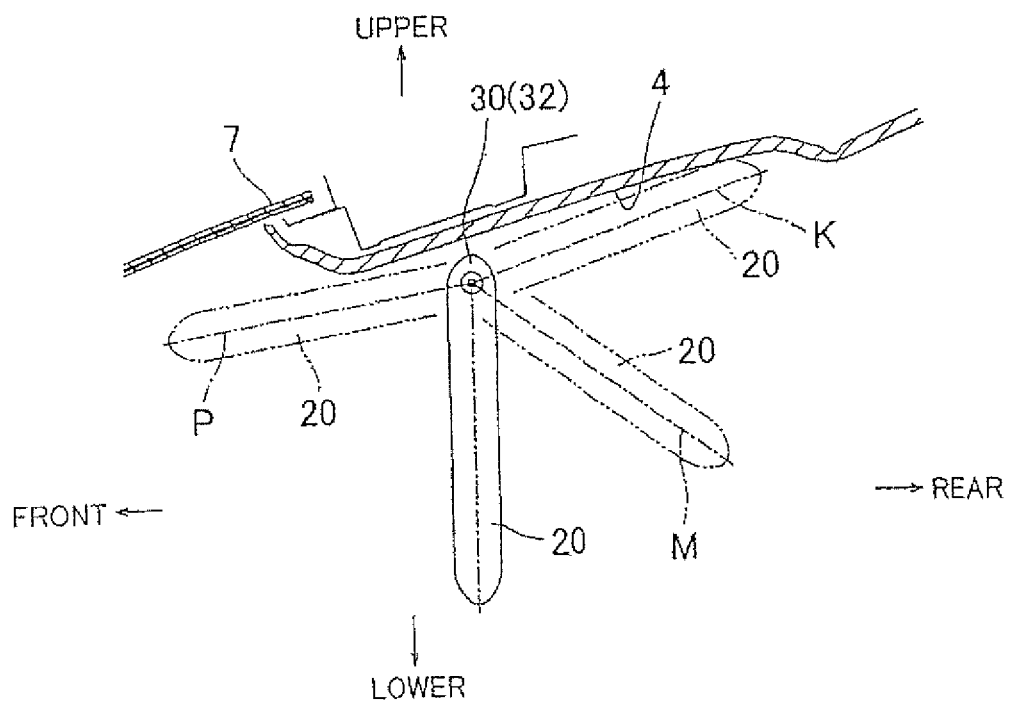
FIG. 2 is a side view that shows a turning range of a sun visor body of the vehicle sun visor.

As shown in FIG. 1, the vehicle sun visor 10 (hereinafter, referred to as sun visor 10) includes a substantially rectangular sun visor body 20 and a support shaft 30. The sun visor body 20 blocks sunlight that enters a vehicle cabin. The support shaft 30 is mounted on a ceiling surface 4 of the vehicle cabin by a bracket 12. The support shaft 30 is formed of a linear lateral shaft 32 and a longitudinal shaft 38 provided at the proximal end side of the lateral shaft 32. The longitudinal shaft 38 is coupled to the bracket 12 so as to be rotatable around its axis. The lateral shaft 32 of the support shaft 30 is inserted in the top side location (see FIG. 1) of the sun visor body 20 in a state where the lateral shaft 32 is relatively rotatable with respect to the sun visor body 20 along the top side. Thus, as shown in FIG. 2, the sun visor body 20 is turnable about the axis of the support shaft 30 (lateral shaft 32) between a storage position K at which the sun visor body 20 is oriented along the ceiling surface 4 of the vehicle cabin and a use limit position P at which the sun visor body 20 is oriented along a windshield 7 of the vehicle cabin. Here, the sun visor body 20 receives turning force toward the storage position K between the storage position K and an urging start position M (see FIG. 2) as will be described later. Between the urging start position M and the use limit position P, the sun visor body 20 receives holding force so as to be held at a turning stop position and not to be turned by turning force under its own weight. Then, in a state where the sun visor body 20 is placed between the urging start position M and the use limit position P, the sun visor body 20 is able to block sunlight, and this position is the use position of the sun visor body 20. Furthermore, by rotating the longitudinal shaft 38 of the support shaft 30 in the counterclockwise direction around its axis with respect to the bracket 12, it is possible to move the sun visor body 20 to a position of a window 8 of a door as indicated by the alternate long and two short dashes line in FIG. 1.

Figure 3:
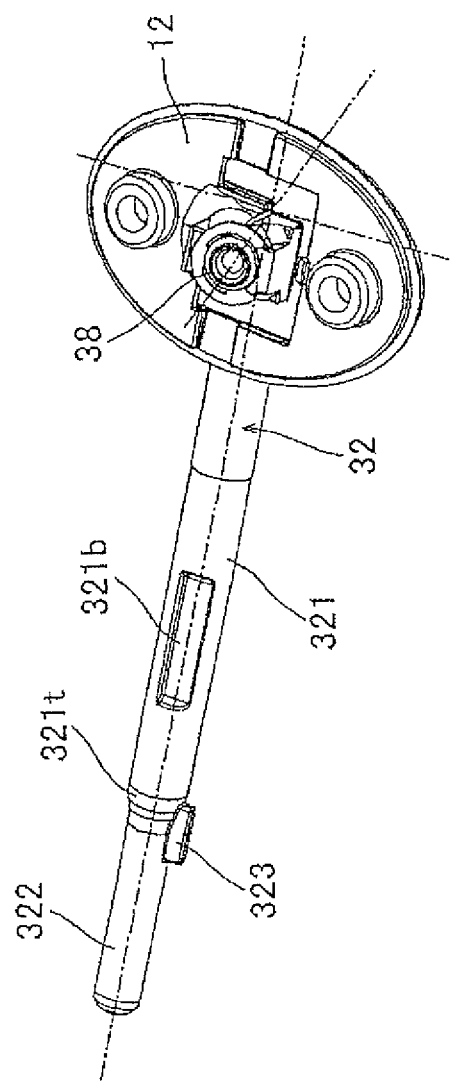
FIG. 3 is a perspective view that shows a support shaft and bracket of the vehicle sun visor.

The support shaft 30 is formed of a solid shaft member. As shown in FIG. 3, the lateral shaft 32 of the support shaft 30 is formed of a proximal end-side large-diameter portion 321 having a large diameter and a distal end-side small-diameter portion 322 having a diameter smaller than that of the large-diameter portion 321. A tapered portion 321t that gradually changes in diameter is provided at the boundary between the large-diameter portion 321 and small-diameter portion 322 of the lateral shaft 32. In addition, a detent 323 is provided from the tapered portion 321t to the proximal end of the small-diameter portion 322. The detent 323 is a protrusion that protrudes radially outward. The distal end portion, that is, the location close to the tapered portion 321t, of the large-diameter portion 321 of the lateral shaft 32 is a portion that is inserted through a bearing portion 25 (described later) of the sun visor body 20, and a portion of the outer periphery of this portion in the circumferential direction is cut into a flat shape, and a leaf spring contact flat face 321b is formed.

Figure 4:
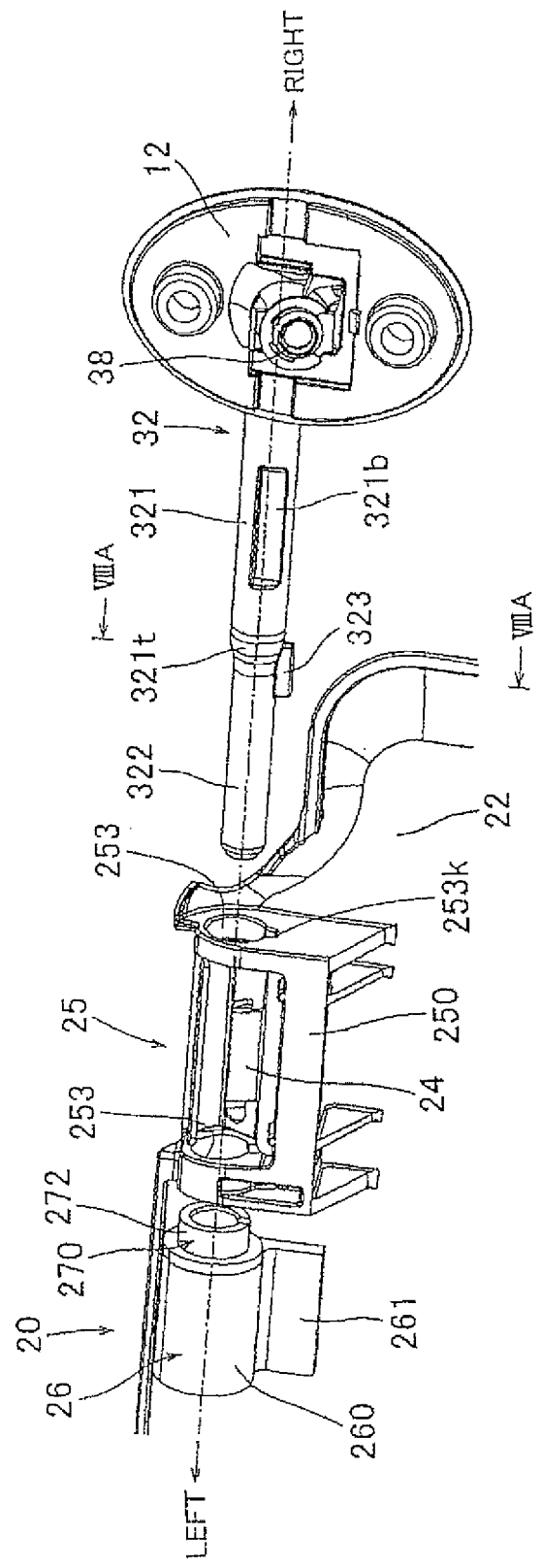
FIG. 4 is an exploded perspective view of a damper, a bearing portion and the support shaft that are incorporated in the sun visor body.

The sun visor body 20 is formed into a hollow shape by mating a shell-shaped front-side shell member 21 (see FIG. 1) and a shell-shaped back-side shell member 22 (see FIG. 4, and the like) with each other. The front-side shell member 21 and the back-side shell member 22 are, for example, molded by injecting resin into a molding die. Here, the front side of the sun visor body 20 means a face on a side facing an occupant when the sun visor body 20 is placed at the use position at which the sun visor body 20 is able to block light. As shown in FIG. 1, a rectangular recess 21h is formed on the right location with respect to the center on the surface of the front-side shell member 21 of the sun visor body 20, and a rectangular mirror unit 20m is fitted into the rectangular recess 21h. In addition, as shown in FIG. 4, the bearing portion 25 and a damper 26 are provided at a location corresponding to the right side of the top side of the sun visor body 20 inside the back-side shell member 22 of the sun visor body 20.

Figure 5:
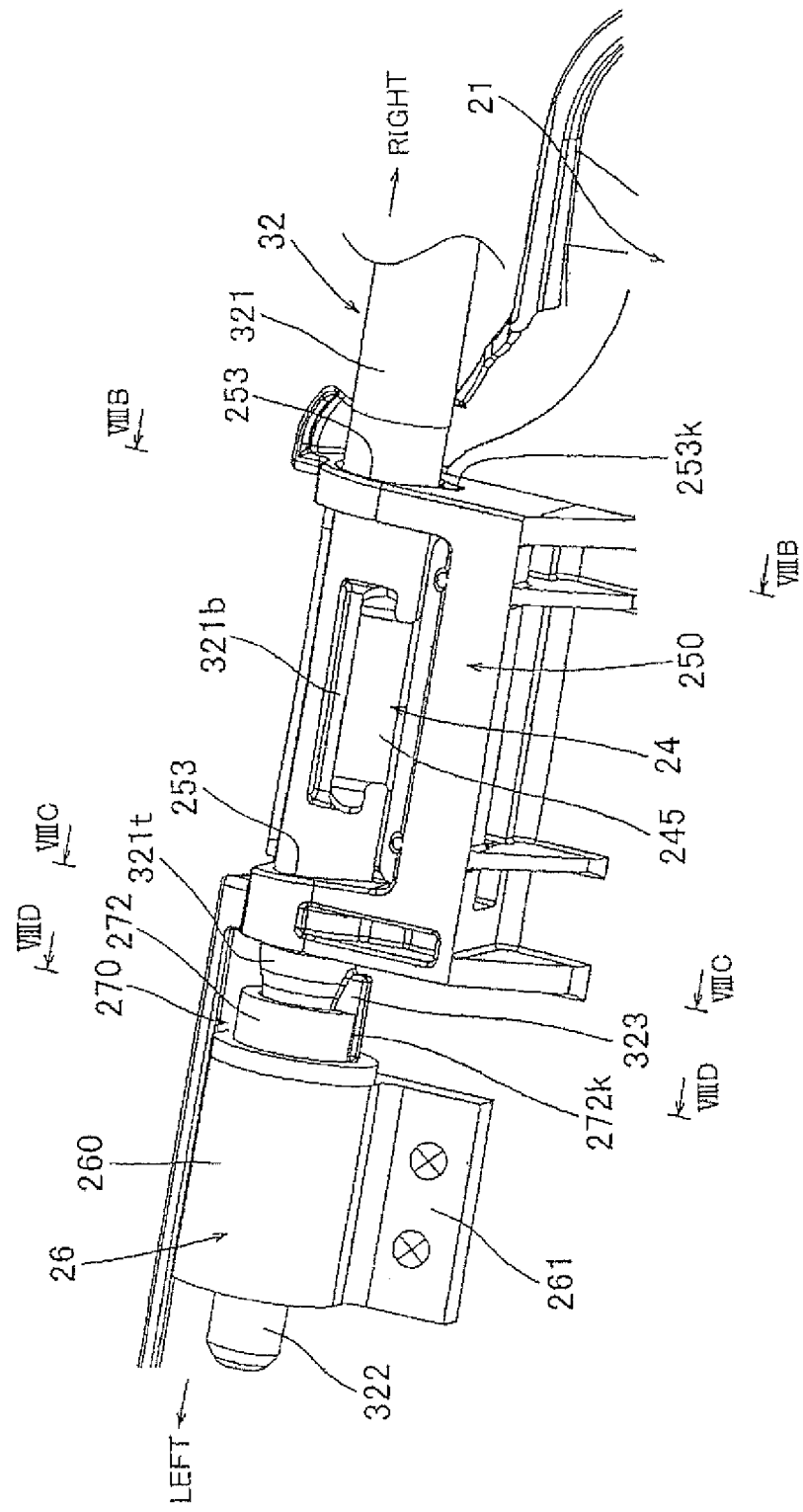
FIG. 5 is a perspective view of assembling the support shaft to the damper and the bearing portion that are incorporated in the sun visor body.

The bearing portion 25 supports the large-diameter portion 321 of the lateral shaft 32 of the support shaft 30. The bearing portion 25 is configured to be able to apply turning force toward the storage position K to the sun visor body 20 between the storage position K and the urging start position M and to apply holding force to the sun visor body 20 between the urging start position M and the use limit position P. With the holding force, it is possible to hold the bearing portion 25 at a current position. As shown in FIG. 4 and FIG. 5, the bearing portion 25 is formed of a bearing case 250 and a leaf spring 24. The bearing case 250 is integrally molded with the back-side shell member 22 of the sun visor body 20. The leaf spring 24 is accommodated in the bearing case 250. The side face of the bearing case 250 is formed in a substantially H shape. Bearing bodies 253 are respectively formed at both right and left ends of the upper portion of the bearing case 250. The large-diameter portion 321 of the lateral shaft 32 of the support shaft 30 is inserted through the bearing bodies 253. Then, a rectangular cutout portion 253k is formed at the lower end location of each bearing body 253. Thus, at the time when the lateral shaft 32 of the support shaft 30 is inserted through the bearing bodies 253, the detent 323 of the lateral shaft 32 is allowed to pass through portions corresponding to the rectangular cutout portions 253k.

Figure 6:
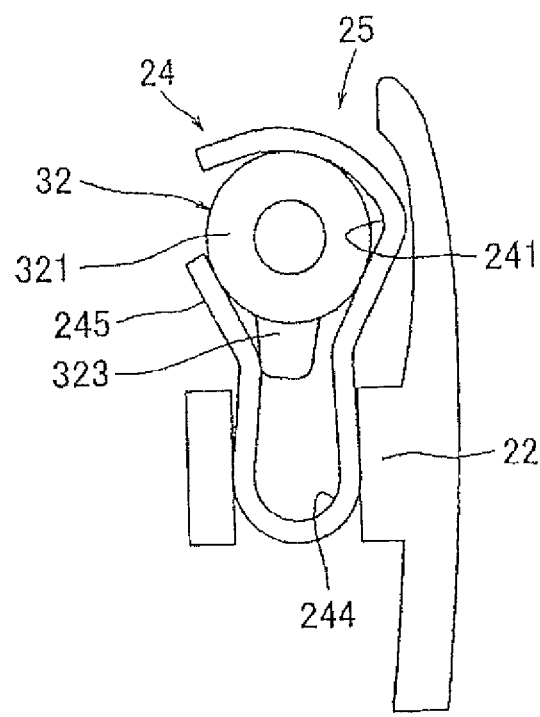
FIG. 6 is a schematic cross-sectional view taken perpendicularly to the axis of a leaf spring portion of the bearing portion.
Figure 7A:
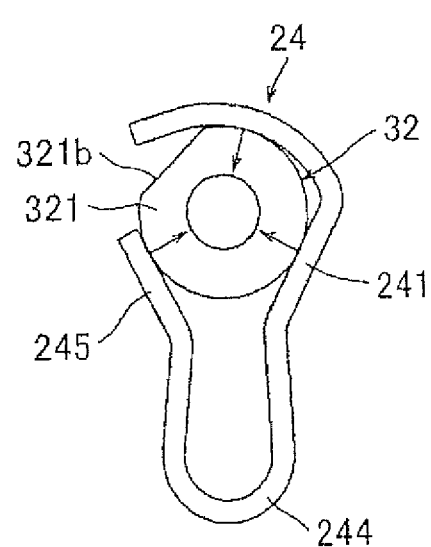
FIG. 7A and FIG. 7B are schematic cross-sectional views that show the function of the leaf spring.
Figure 7B:
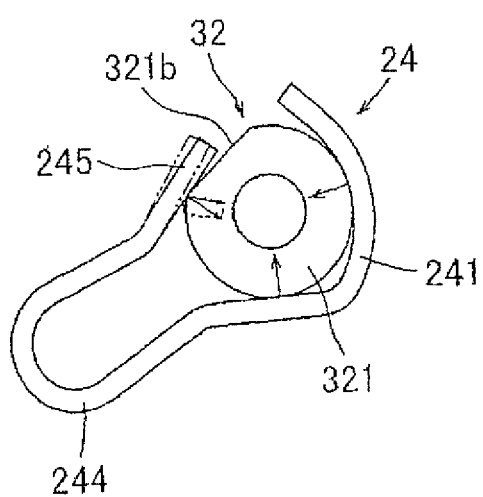

The leaf spring 24 of the bearing portion 25 is fitted between the right and left bearing bodies 253 of the bearing case 250. As shown in FIG. 6, FIG. 7A and FIG. 7B, the leaf spring 24 is formed of a trapezoidal surrounding portion 241, a U-shaped spring portion 244 and a flat sheet portion 245. The surrounding portion 241 presses the outer periphery of the large-diameter portion 321 of the lateral shaft 32 at two portions spaced at an interval of about 120° in the circumferential direction. The U-shaped spring portion 244 is bent in a hairpin shape continuously with the surrounding portion 241. The flat sheet portion 245 is provided at the other end side of the U-shaped spring portion 244, and presses the outer periphery of the large-diameter portion 321 of the lateral shaft 32 from a location spaced at an interval of about 120° in the circumferential direction from the surrounding portion 241. The width (width in the direction along the axis of the lateral shaft 32) of the flat sheet portion 245 of the leaf spring 24 is set so as to be equal to the axial length of the leaf spring contact flat face 321b formed at the large-diameter portion 321 of the lateral shaft 32 (see FIG. 5). In addition, the width of each of the surrounding portion 241 and U-shaped spring portion 244 of the leaf spring 24 is set to a value sufficiently larger than the width of the flat sheet portion 245.

When the sun visor body 20 is located at the use position (between the urging start position M and the use limit position P), the surrounding portion 241 and flat sheet portion 245 of the leaf spring 24 both press the outer periphery of the large-diameter portion 321 of the lateral shaft 32 as shown in FIG. 7A, and spring force that acts toward the center of the large-diameter portion 321 of the lateral shaft 32 keeps balance in the circumferential direction. Therefore, the large-diameter portion 321 of the lateral shaft 32 is fastened from the surroundings by the spring force of the leaf spring 24, and a turn under its own weight of the sun visor body 20 with respect to the lateral shaft 32 of the support shaft 30 is prohibited. That is, the sun visor body 20 is held at the use position. In addition, when the sun visor body 20 is located between the storage position K and the urging start position M, the surrounding portion 241 of the leaf spring 24 presses the outer periphery of the large-diameter portion 321 of the lateral shaft 32, and the flat sheet portion 245 presses part of the leaf spring contact flat face 321b of the large-diameter portion 321 as shown in FIG. 7B. Thus, spring force that acts on the large-diameter portion 321 of the lateral shaft 32 loses balance in the circumferential direction, and turning force toward the storage position K acts on the sun visor body 20.

The damper 26 is used to apply braking force to a turn of the sun visor body 20 toward the storage position K and not to generate unpleasant sound at the time when the sun visor body 20 contacts the ceiling surface 4 of the vehicle cabin at the storage position K. As shown in FIG. 4 and FIG. 5, the damper 26 includes a cylindrical rotor 270 and the rotor case 260. The rotor case 260 supports the rotor 270 such that the rotor 270 is rotatable around its axis. A flange portion 261 is formed at the lower-side location of the rotor case 260 of the damper 26. The flange portion 261 is screwed to the back-side shell member 22 of the sun visor body 20. In addition, at the upper location of the rotor case 260 of the damper 26, a bearing portion (not shown) that supports the rotor 270 such that the rotor 270 is rotatable around the axis is provided, and a ring-shaped hydraulic pressure chamber (not shown) is provided around the bearing portion.

As shown in FIG. 5, the rotor 270 includes a cylindrical rotor body 272 through which the small-diameter portion 322 of the lateral shaft 32 of the support shaft 30 is inserted. As shown in FIG. 5, the right end portion of the rotor body 272 protrudes in the axial direction from the rotor case 260, and a detent cutout 272k to which the detent 323 formed at the lateral shaft 32 of the support shaft 30 is formed at the protruded end portion. That is, the small-diameter portion 322 of the lateral shaft 32 of the support shaft 30 is inserted in the rotor body 272 and the detent 323 of the lateral shaft 32 is fitted to the detent cutout 272k of the rotor body 272. Thus, the rotor 270 is held so as to be relatively non-rotatable with respect to the lateral shaft 32 of the support shaft 30. A hydraulic pressure receiving portion (not shown) molded in a flange shape is coaxially provided on the outer periphery of the rotor body 272 of the rotor 270. In a state where the rotor body 272 of the rotor 270 is accommodated in the bearing portion of the rotor case 260, the hydraulic pressure receiving portion of the rotor 270 is accommodated in the hydraulic pressure chamber of the rotor case 260. That is, the rotor body 272 functions as a cylindrical portion of the invention.

Next, assembling of the sun visor body 20 and the support shaft 30 will be described. First, as shown in FIG. 4 and FIG. 5, the damper 26 is mounted at a predetermination location of the back-side shell member 22 of the sun visor body 20. At this time, as shown in FIG. 8A to FIG. 8D, the phase of the detent cutout 272k of the rotor 270 of the damper 26 is adjusted to the phase of the cutout portions 253k provided at the bearing bodies 253 of the bearing case 250 of the bearing portion 25. That is, the detent cutout 272k is held downward by rotating the rotor 270 of the damper 26. FIG. 8A is a cross-sectional view taken along the line VIIIA-VIIIA in FIG. 4. FIG. 8B is a cross-sectional view taken along the line VIIIB-VIIIB in FIG. 5. FIG. 8C is a cross-sectional view taken along the line VIIIC-VIIIC in FIG. 5. FIG. 8D is a cross-sectional view taken along the line VIIID-VIIID in FIG. 5. In this state, the sun visor body 20 is formed by assembling the front-side shell member 21 and the back-side shell member 22 to each other. After that, the detent 323 of the lateral shaft 32 of the support shaft 30 is oriented downward as shown in FIG. 5A, the lateral shaft 32 is inserted from the right side of the sun visor body 20 to the top side location of the sun visor body 20. At this time, the distal end side of the lateral shaft 32 of the support shaft 30 is the small-diameter portion 322, so the small-diameter portion 322 is smoothly inserted through the bearing body 253 of the bearing portion 25 and the leaf spring 24, and is able to guide the large-diameter portion 321 to the location of the bearing body 253 and leaf spring 24. Here, the detent 323 formed between the small-diameter portion 322 and large-diameter portion 321 of the lateral shaft 32 is held downward, and is aligned with the phase of the cutout portions 253k respectively formed at the bearing bodies 253 of the bearing portion 25. Therefore, the detent 323 of the lateral shaft 32 is allowed to pass through the cutout portion 253k of the right-side bearing body 253 (see FIG. 8B), and the large-diameter portion 321 of the lateral shaft 32 is allowed to be inserted through the bearing portion 25. That is, the large-diameter portion 321 of the lateral shaft 32 that has passed through the right-side bearing body 253 is inserted through the leaf spring 24 in process of being pressed leftward, and further inserted through the left-side (damper 26-side) bearing body 253 (see FIG. 8C). The detent 323 of the lateral shaft 32 has passed through the cutout portion 253k of the left-side bearing body 253, and is then fitted to the detent cutout 272k of the damper 26 (rotor body 272) having the same phase as that of the cutout portions 253k (see FIG. 8D). This position is an insertion limit position of the lateral shaft 32, and the axial location of the leaf spring contact flat face 321b formed at the large-diameter portion 321 of the lateral shaft 32 coincides with the axial location of the flat sheet portion 245 provided at the leaf spring 24 of the bearing portion 25.

The small-diameter portion 322 at the distal end side of the lateral shaft 32, which has passed through the bearing portion 25, is inserted through the rotor body 272 of the rotor 270 of the damper 26, and then, as shown in FIG. 5, the distal end portion protrudes leftward from the rotor body 272. In this way, in a state where the lateral shaft 32 of the support shaft 30 is inserted in the sun visor body 20 to the insertion limit position, the sun visor body 20 is turned around its axis with respect to the lateral shaft 32. Thus, the rotor case 260 of the damper 26 mounted on the sun visor body 20 rotates with respect to the rotor 270 of the damper 26 engaged with the lateral shaft 32 of the support shaft 30. In addition, similarly, the bearing portion 25 that is mounted on the sun visor body 20 rotates with respect to the lateral shaft 32 of the support shaft 30. As a result, the detent 323 of the lateral shaft 32 that has passed through the cutout portion 253k of the left-side (damper 26-side) bearing body 253 of the bearing portion 25 rotates with respect to the cutout portion 253k of the bearing body 253, and is hooked on the outside of the bearing body 253. Thus, the lateral shaft 32 of the support shaft 30 is retained with respect to the sun visor body 20. Therefore, the damper 26 and bearing portion 25 of the sun visor body 20 are held so as to be relatively non-movable in the axial direction with respect to the lateral shaft 32 of the support shaft 30.

Next, the operation of the sun visor 10 according to the present embodiment will be described. When the sun visor 10 is used, the sun visor body 20 located at the storage position K is held with hand and is turned to the use position. At this time, until the sun visor body 20 exceeds the urging start position M, the turning torque of the leaf spring 24, which attempts to turn the sun visor body 20 toward the storage position K, acts on the sun visor body 20, so the sun visor body 20 is turned by force that exceeds the turning torque. When the sun visor body 20 exceeds the urging start position M, the spring force of the leaf spring 24 keeps balance in the circumferential direction, and acts in the direction in which the lateral shaft 32 of the support shaft 30 is fastened. Thus, when a turn of the sun visor body 20 is stopped at the use position, the sun visor body 20 is held at a current position by the spring force of the leaf spring 24.

When the sun visor 10 is stored, the sun visor body 20 placed at the use position is turned to the urging start position M against the fastening force (holding force) of the leaf spring 24 and the braking force of the damper 26. The turning torque of the leaf spring 24, which attempts to turn the sun visor body 20 toward the storage position K, acts on the sun visor body 20 from the urging start position M, so the sun visor body 20 is returned to the storage position K by the turning torque of the leaf spring 24.

With the sun visor 10 according to the present embodiment, the rotor 270 of the damper 26 includes the rotor body 272 (cylindrical portion) in which the support shaft 30 (lateral shaft 32) is inserted. That is, the rotor 270 of the damper 26 is formed to have a larger diameter than the lateral shaft 32, and the lateral shaft 32 is inserted in (extends through) the rotor 270. Therefore, it is possible to relatively increase the strength of the coupling portion between the rotor 270 of the damper 26 and the lateral shaft 32. Therefore, the coupling portion between the lateral shaft 32 and the rotor 270 of the damper 26 is hard to break even when an occupant attempts to turn the sun visor body 20 with strong operating force and then large force acts on the coupling portion. In addition, the detent 323 that retains the support shaft 30 (lateral shaft 32) from the sun visor body 20 may be used as a rotation stopper between the lateral shaft 32 and the rotor 270 of the damper 26, so a reduction in the number of components is achieved.

In the present embodiment, the strength of the coupling portion between the rotor and the lateral shaft is increased by forming the rotor 270 such that the rotor 270 is larger in diameter than the lateral shaft 32 and then inserting the lateral shaft 32 in the rotor 270. However, the strength of the coupling portion may be increased by forming the material of the rotor from a material having a larger stiffness than the lateral shaft. In addition, even when the rotor and the lateral shaft are made from the same material, the rotor may have a larger stiffness than the lateral shaft through the wall thickness or structure of the rotor.

Figure 9A:
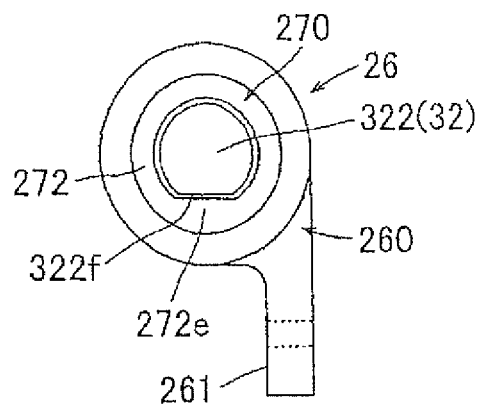
FIG. 9A to FIG. 9C are schematic views that show alternative embodiments of the detent structure for the support shaft with respect to the rotor of the damper.
Figure 9B:
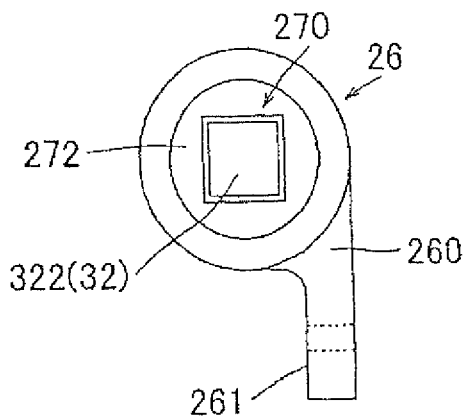
Figure 9C:
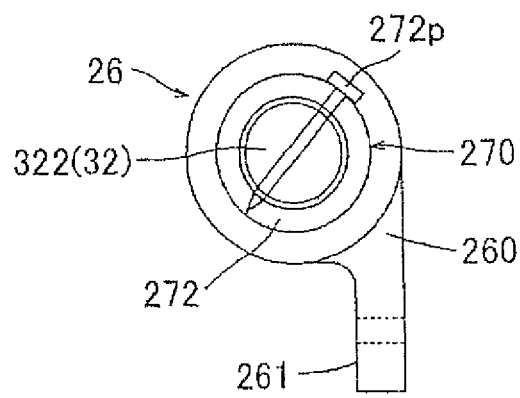
Figure 10A:
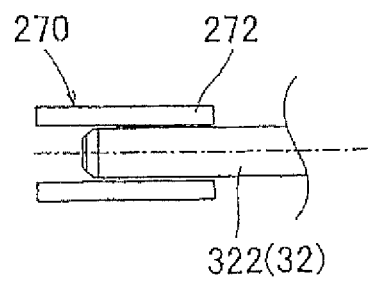
FIG. 10A and FIG. 10B are schematic views that show alternative embodiments of an insertion structure for the support shaft with respect to the rotor of the damper.
Figure 10B:
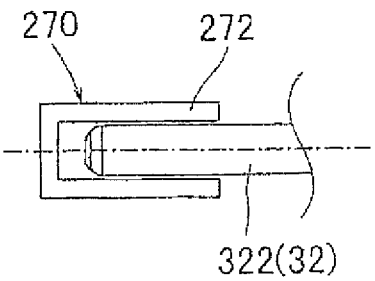
Figure 11:
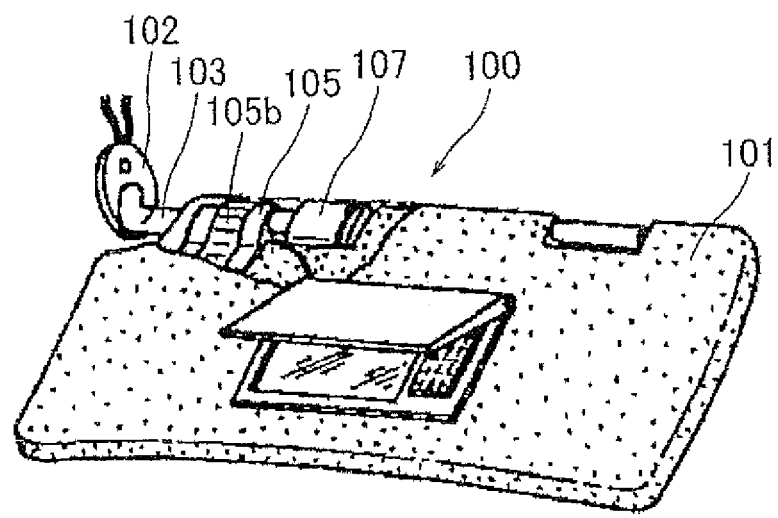
FIG. 11 is a partially cut-out perspective view that shows a vehicle sun visor according to the related art.
Figure 12:
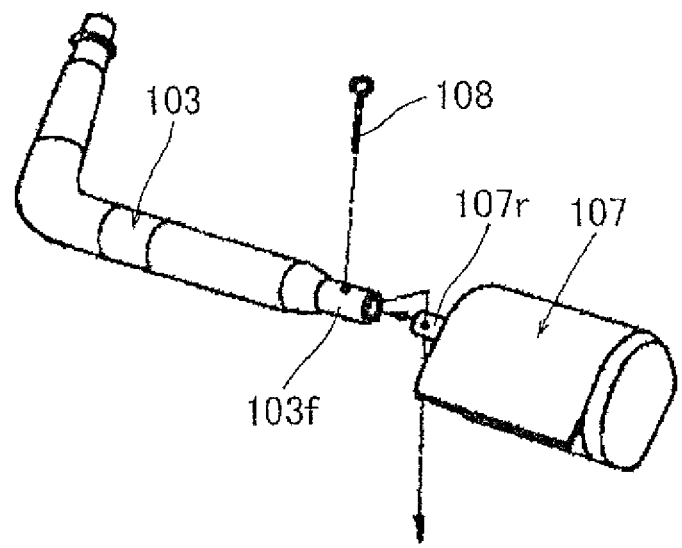
FIG. 12 is a perspective view that shows a coupling structure between a support shaft and a damper in the vehicle sun visor according to the related art.

Here, the invention is not limited to the above-described embodiment; it may be modified without departing from the scope of the invention. For example, in the present embodiment, the description is made on the example in which, as a rotation stopper for the lateral shaft 32 of the support shaft 30 with respect to the rotor 270 of the damper 26, the rotor 270 has the detent cutout 272k, the lateral shaft 32 has the detent 323 and both 272k, 323 are fitted to each other. Instead, as shown in FIG. 9A, it is possible to constitute a rotation stopper by forming a projecting portion 272e on the inner periphery of the rotor body 272 of the rotor 270 and forming a recess 322f, to which the projecting portion 272e is fitted, on the outer periphery of the small-diameter portion 322 of the lateral shaft 32. In addition, as shown in FIG. 9B, it is possible to constitute a rotation stopper by forming the inside of the rotor body 272 into a rectangular shape and forming the small-diameter portion 322 of the lateral shaft 32 into a rectangular columnar shape. Furthermore, as shown in FIG. 9C, it is also applicable that a through-hole that is continuous in the radial direction from the rotor body 272 of the rotor 270 to the small-diameter portion 322 of the lateral shaft 32 is formed and a detent pin 272p is inserted in the through-hole. In addition, in the present embodiment, the description is made on the example in which the lateral shaft 32 of the support shaft 30 is inserted through the rotor 270 of the damper 26. However, depending on the type of sun visor, it is also applicable that, as shown in FIG. 10A and FIG. 10B, the distal end portion of the lateral shaft 32 of the support shaft 30 is retained inside the rotor 270 of the damper 26. In the present embodiment, as shown in FIG. 4 and FIG. 5, the description is made on the example in which the damper 26 and the bearing portion 25 are fixed to the sun visor body 20 and the damper 26 and the bearing portion 25 are held so as to be relatively non-movable in the axial direction with respect to the lateral shaft 32 of the support shaft 30. However, for example, it is also applicable that the damper 26 and the bearing portion 25 are held so as to be slidable along the upper side of the sun visor body 20 with respect to the sun visor body 20. In addition, in the present embodiment, the description is made on the example, in which the damper 26 is screwed to the sun visor body 20; instead, the damper 26 and the bearing portion 25 may be coupled to each other by a screw or welding. Alternatively, for example, the damper 26 and the bearing portion 25 may be coupled to each other using another component, such as an E type retaining ring. In addition, in the present embodiment, the description is made on the example in which the support shaft 30 is formed of a solid shaft member. However, the support shaft 30 may be formed of a hollow shaft member. Furthermore, it is applicable that the lateral shaft 32 is formed long along the slide rail 23 such that the sun visor body 20 is slidable with respect to the lateral shaft 32 of the support shaft 30.

What is claimed is:

1. A vehicle sun visor comprising:
    a sun visor body;
    a support shaft mounted on a ceiling surface of a vehicle cabin and configured to support the sun visor body at a turning center position of the sun visor body such that the sun visor body is turnable between a storage position, at which the sun visor body is oriented along the ceiling surface of the vehicle cabin, and a use position, at which the sun visor body is able to block light; and
    a damper configured to apply braking force at the time when the sun visor body turns, wherein
    the damper includes:
        a rotor, the rotor being formed to have a larger diameter than the support shaft, and the rotor including a portion in which the support shaft is inserted, the portion being held so as to be non-rotatable with respect to the support shaft; and
        a rotor case that supports the rotor such that the rotor is rotatable around its axis, the rotor case being held by the sun visor body in a state where the rotor case is non-rotatable with respect to the sun visor body.

2. The vehicle sun visor according to claim 1, wherein:
    a projecting portion is formed on an inner periphery of a rotor body of the rotor, and
    a recess that fits the projecting portion is formed on an outer periphery of the support shaft.

3. The vehicle sun visor according to claim 1, wherein an inside of a rotor body of the rotor is formed into a rectangular shape and a small-diameter portion of the support shaft is formed into a rectangular columnar shape.

4. The vehicle sun visor according to claim 1, wherein a detent pin is inserted in a through hole that is continuous in a radial direction from a rotor body of the rotor to the support shaft.

5. The vehicle sun visor according to claim 1, wherein the support shaft extends through the rotor.

6. The vehicle sun visor according to claim 5, wherein:
    a projecting portion is formed on an inner periphery of a rotor body of the rotor, and
    a recess that fits the projecting portion is formed on an outer periphery of the support shaft.

7. The vehicle sun visor according to claim 5, wherein an inside of a rotor body of the rotor is formed into a rectangular shape and a small-diameter portion of the support shaft is formed into a rectangular columnar shape.

8. The vehicle sun visor according to claim 5, wherein a detent pin is inserted in a through hole that is continuous in a radial direction from a rotor body of the rotor to the support shaft.

9. The vehicle sun visor according to claim 1, wherein the support shaft is retained inside the rotor.

10. The vehicle sun visor according to claim 1, wherein the rotor case includes a flange portion that is formed at a lower-side of the rotor case, the flange portion being attached to the sun visor body.

11. The vehicle sun visor according to claim 1, wherein a portion of a rotor body of the rotor protrudes from an end of the rotor case in an axial direction.

12. The vehicle sun visor according to claim 1, wherein the sun visor body includes a bearing portion, the bearing portion having a leaf spring.

13. The vehicle sun visor according to claim 12, wherein the leaf spring is formed by a trapezoidal surrounding portion, a U-shaped spring portion, and a flat sheet portion.

14. The vehicle sun visor according to claim 1, wherein the portion of the rotor in which the support shaft is inserted has a cylindrical shape.

15. The vehicle sun visor according to claim 9, wherein:
    a projecting portion is formed on an inner periphery of a rotor body of the rotor, and
    a recess that fits the projecting portion is formed on an outer periphery of the support shaft.

16. The vehicle sun visor according to claim 9, wherein an inside of a rotor body of the rotor is formed into a rectangular shape and a small-diameter portion of the support shaft is formed into a rectangular columnar shape.

17. The vehicle sun visor according to claim 9, wherein a detent pin is inserted in a through hole that is continuous in a radial direction from a rotor body of the rotor to the support shaft.

* * * * *